United States Patent [19]

Ball

[11] Patent Number: 4,763,239
[45] Date of Patent: Aug. 9, 1988

[54] SWITCHED MODE POWER SUPPLIES

[75] Inventor: David P. Ball, Henderson, New Zealand

[73] Assignee: Thorn Emi Lighting (NZ) Limited, Avondale, New Zealand

[21] Appl. No.: 870,185

[22] Filed: Jun. 3, 1986

[30] Foreign Application Priority Data

Jun. 4, 1985 [NZ] New Zealand .................. 212287

[51] Int. Cl.⁴ .................. H02M 3/335; H05B 41/29; H05B 41/392
[52] U.S. Cl. .................. 363/98; 363/17; 363/58; 315/DIG. 7
[58] Field of Search .................. 363/17, 56, 98, 132, 363/57, 58; 315/DIG. 7

[56] References Cited

U.S. PATENT DOCUMENTS

| | | | |
|---|---|---|---|
| 4,251,752 | 2/1981 | Stolz | 315/206 |
| 4,370,600 | 1/1983 | Zansky | 363/56 X |
| 4,392,087 | 7/1983 | Zansky | 363/56 X |
| 4,511,823 | 4/1985 | Eaton et al. | 315/DIG. 7 X |
| 4,639,849 | 1/1987 | Noworolski et al. | 363/132 X |

FOREIGN PATENT DOCUMENTS

| | | |
|---|---|---|
| 0059064 | 9/1982 | European Pat. Off. . |
| 0059053 | 9/1982 | European Pat. Off. . |
| 2115627 | 9/1983 | United Kingdom . |
| 2124042 | 2/1984 | United Kingdom . |

Primary Examiner—Patrick R. Salce
Assistant Examiner—Emanuel Todd Voeltz
Attorney, Agent, or Firm—Fleit, Jacobson, Cohn & Price

[57] ABSTRACT

A switched mode power supply has two separate, alternately conductive switching paths, each including two switching elements. Smoothing capacitors are connected in series across the series connection of one switching element in each of the switching paths and to the supply lines via further capacitors. In a further embodiment, a primary winding of a transformer is connected in series with the load and a capacitive network incorporating a secondary winding of the transformer is provided in conjunction with one of the switching elements in each path. Current draw from a rectified supply input is controlled at least once in each cycle by current flowing in the secondary due to the current in the primary.

14 Claims, 7 Drawing Sheets

SWITCHED MODE POWER SUPPLIES

This invention relates to switched mode power supplies and in particular to such a power supply suitable for operating gas discharge lamps, as an alternative to known electromagnetic ballasts.

In a circuit in which it is required to provide a high frequency supply to a load it is known to feed a rectified A.C. supply voltage to an inverter which provides a high frequency supply to the load. The A.C. supply voltage reduces to zero during each half cycle crossover and if, when the supply is to a lamp, the inverter was run directly off the rectified A.C. supply, the lamp would extinguish during each crossover and would require re-ignition. This would result in lamp flicker and poor lamp efficiency.

It is known to use a capacitor to smooth the rectified A.C. supply, thus providing power for the inverter during the A.C. supply crossovers.

The provision of such a smoothing capacitor, however, causes harmonic distortion of the current waveform. The charge on the capacitor is "topped up" during periods in which the rectified output is higher than the voltage across the smoothing capacitor, (when the supply voltage approaches a peak). If a large capacitor is used, the charging time, or conduction angle, is very small and all the required charge has to be loaded into the capacitor in a short period of time. This results in heavy current spikes in the A.C. supply which are undesirable.

If, on the other hand, the capacitor is very small, the input of the inverter presents a substantially resistive load to the full wave rectifier. The rectifiers conduct over substantially the whole of each mains half cycle so that current drawn from the supply is spread over substantially the whole of each half cycle and harmonic interference is low. However, problems exist here similar to those which arise when no smoothing capacitor is provided. That is, there is a trough in the supply voltage to the inverter twice in every cycle provided by the A.C. supply, at which points the voltage is too low and a lamp supplied by the inverter may extinguish and reignite, introducing flicker.

One solution to the problem of harmonic distortion is to use an inductive and capacititive filter between the A.C. supply and ballast input, in order to quench the current spikes. This however, requires the use of large inductors which tend to be bulky and expensive and have a high power loss.

Another known solution is to use an electronic pre-regulator circuit. This transfers energy stored in an inductor to a storage capacitor at a high frequency and improves the system efficiency. This system however requires control and protection circuits in order to regulate the discharge of current from the storage inductor to prevent over-generation and ballast failure. The circuit is complex and could be expensive to produce.

An object of the invention is to provide a means of reduction of supply current harmonics and thus also to improve the Power Factor.

According to the invention there is provided a switched mode power supply operative on a unidirectional input current from a rectified supply having positive and negative supply lines derived by a full wave rectifier from an alternating supply for providing an output current to a load, the power supply comprising:
 capacitive smoothing means,
 two alternately conductive switching means,
 each switching means comprising two switching elements,
 the switching means for connecting a load between the positive and negative supply lines of the rectified supply,
 in use the current through the load alternating as alternate switching means are conductive,
 each switching element being shunted by a return unidirectional device,
 the capacitive smoothing means being connected in parallel with one switching element of each of the switching means and to the positive and negative supply lines of the rectified supply by respective further capacitive means shunted by respective unidirectional devices,
 the arrangement being such that in operation current draw from the supply is substantially continuous.

The unidirectional devices may be diodes.

According to a further aspect of the invention there is provided a switched mode power supply operative on a unidirectional input current derived by a full wave rectifier from an alternating supply for providing an output current to a load, the power supply comprising:
 two alternately operative switching means,
 each switching means comprising two switching elements,
 in use the power supply being connected via a first winding of an electromagnetic coupling device to a load,
 a capacitive network being arranged to provide a specific capacitive circuit across one switching element of each switching means,
 a second winding of the electromagnetic coupling device being connected into the capacitive network to be common to each of the specific capacitive circuits,
 the arrangement being such that in operation current draw from the alternating supply is substantially continuous,
 the current draw from the alternating supply being controlled at least once in each alternating supply cycle by a component thereof which flows alternately in each of the specific capacitive circuits and being controlled by the e.m.f. generated in the second winding of the electromagnetic coupling device due to the load current which flows in the first winding.

In order that the invention may be clearly understood and readily carried into effect, it will be described by way of example with reference to the accompanying drawings, of which.

Figure 1:
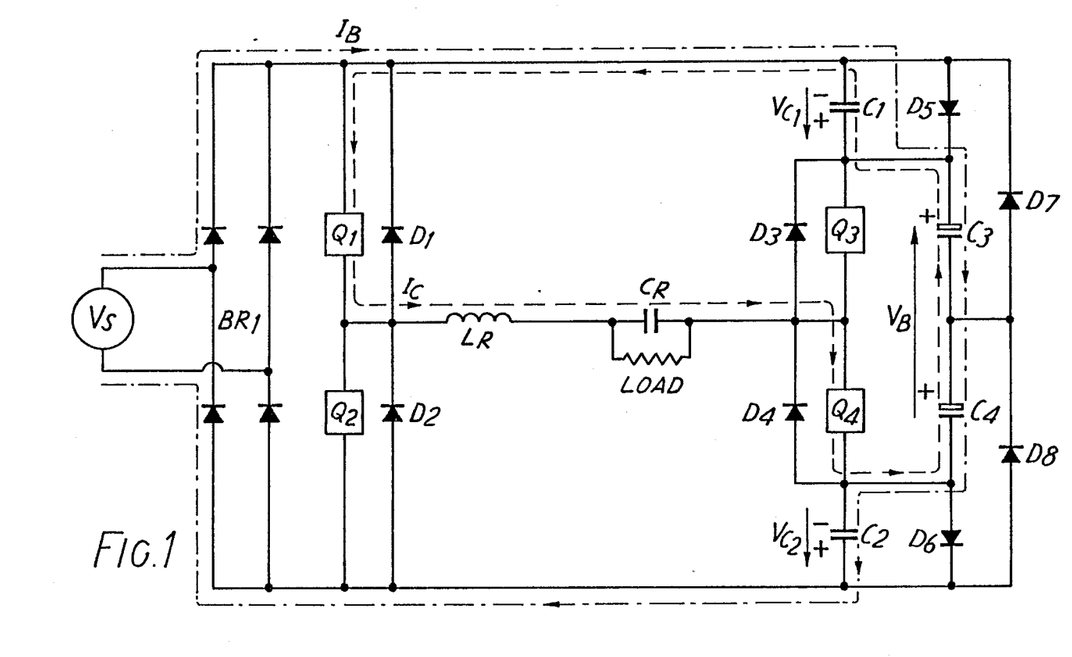
FIGS. 1 to 6 show current paths in the circuit of an embodiment of the invention.

Referring first to FIG. 1, an A.C. power supply $V_s$, for example a conventional mains power supply, has a load connected across it by two of alternately operative switching means. The supply is rectified by the bridge $BR_1$ (which is a full wave rectifier) to provide a rectified supply having positive and negative supply lines. The rectified supply provides a unidirectional input current for the switched mode power supply. The switching elements may be, for example, MOSFETs, gate turnoff thyristors or transistors represented by Q1 and Q4 which comprise one of the switching means and Q2 and Q3 which comprise the other switching means. The switching elements are each shunted by respective return unidirectional devices, for example diodes, $D_1$, $D_2$, $D_3$ and $D_4$.

The rate of switching of the switching means may be controlled by any suitable external circuits.

In operation, when $Q_1$ and $Q_4$ are conducting, $Q_2$ and $Q_3$ are non-conductive and vice versa, the conduction times being governed by the need to supply H.F. current to the load over a series resonant circuit $L_R$ and $C_R$.

Prior to rendering the switches conductive, all capacitors, including $C_3$ and $C_4$, are charged by the rectified mains supply current. Thus when $Q_1$ and $Q_4$ are rendered conductive (ON), a voltage $V_B$ is available across the capacitive smoothing means $C_3$ and $C_4$. In the event that $V_B$ is greater than the instantaneous rectified supply voltage, a current $I_C$ flows in the chain $Q_1$, $Q_4$, $C_4$, $C_3$ and $C_1$ and a voltage $V_{C1}$ is developed across capacitor $C_1$ in the reverse polarity to that ($V_B$) across $C_3$ and $C_4$. The voltage $V_B-(V_{C1}+V_{C2})$ (where $V_{C2}$ is the voltage across capacitor $C_2$) can therefore fall below the instantaneous rectified supply voltage. When this happens, a current $I_B$ is caused to flow from the mains rectifier in an opposite sense to current $I_C$, replenishing the charge on $C_3$ and $C_4$ and maintaining current drawn from the supply.

Figure 2:
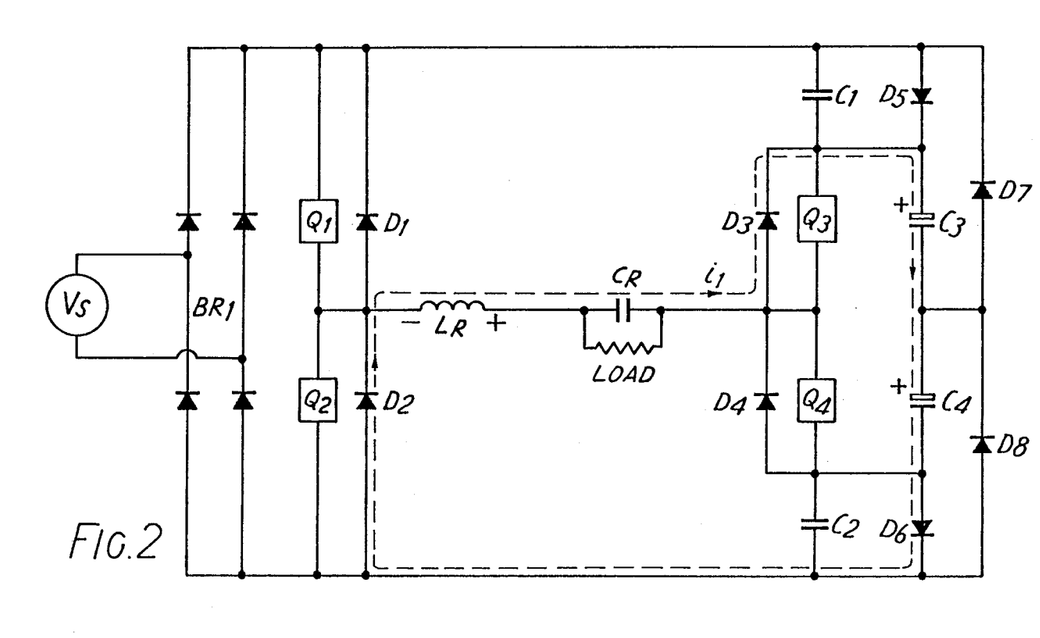

Referring to FIG. 2, this represents the state when $Q_1$ and $Q_4$ turn OFF (i.e. become non-conductive) and $Q_2$ and $Q_3$ are still OFF. Energy stored in the inductor $L_R$ generates an e.m.f. which causes a current $i_1$ to flow around the loop indicated via unidirectional devices $D_2$ and $D_3$ to charge the capacitors $C_3$ and $C_4$.

Figure 3:
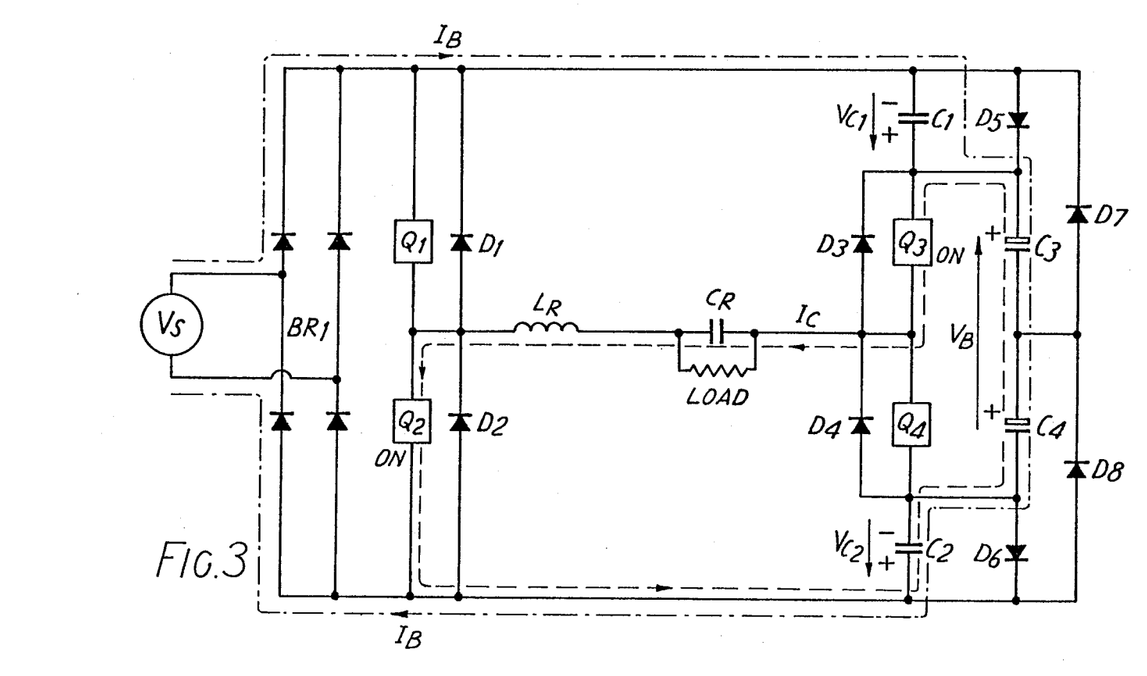

FIG. 3 shows the situation when $Q_2$ and $Q_3$ are rendered conductive. When they become conductive, the cycle is repeated, the situation being essentially the same as in FIG. 1 except that the current $I_C$ is developed in the lower half of the circuit and charges $C_2$ rather than $C_1$. A voltage $V_{C2}$ is therefore developed across capacitor $C_2$.

Figure 4:
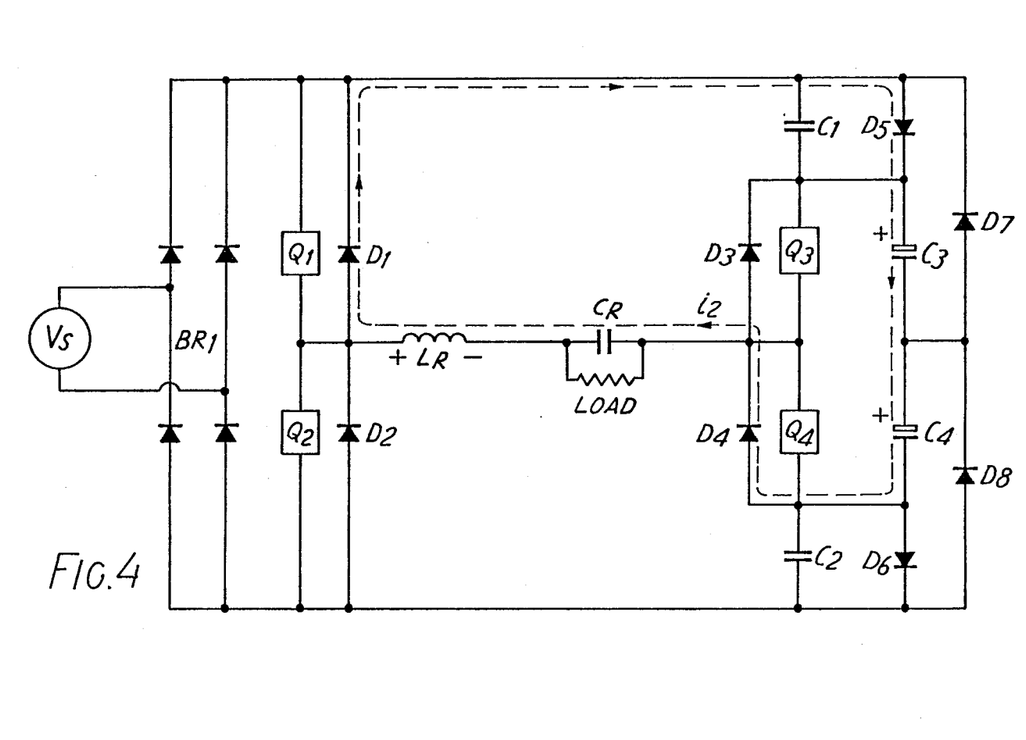

When $Q_2$ and $Q_3$ become non-conductive (i.e. $Q_1$, $Q_2$, $Q_3$ and $Q_4$ all OFF), the position is as shown in FIG. 4 and energy stored in $L_R$ provides a charging current $i_2$ into $C_3$ and $C_4$ around the loop via $D_1$ and $D_4$, which is oppositely directed through the load to $i_1$ (shown in FIG. 2).

The cycle thus begins to repeat itself, alternating between the switching means $Q_1$ and $Q_4$ on the one hand and $Q_2$ and $Q_3$ on the other hand.

Diodes $D_7$ and $D_8$ provide that at least half of the voltage $V_B$ across $C_3$ and $C_4$ is available to the load during a supply crossover. Diodes $D_5$ and $D_6$ are included at least in the current paths as indicated in FIGS. 2 and 4.

The current drawn from the supply is substantially continuous.

Figure 5:
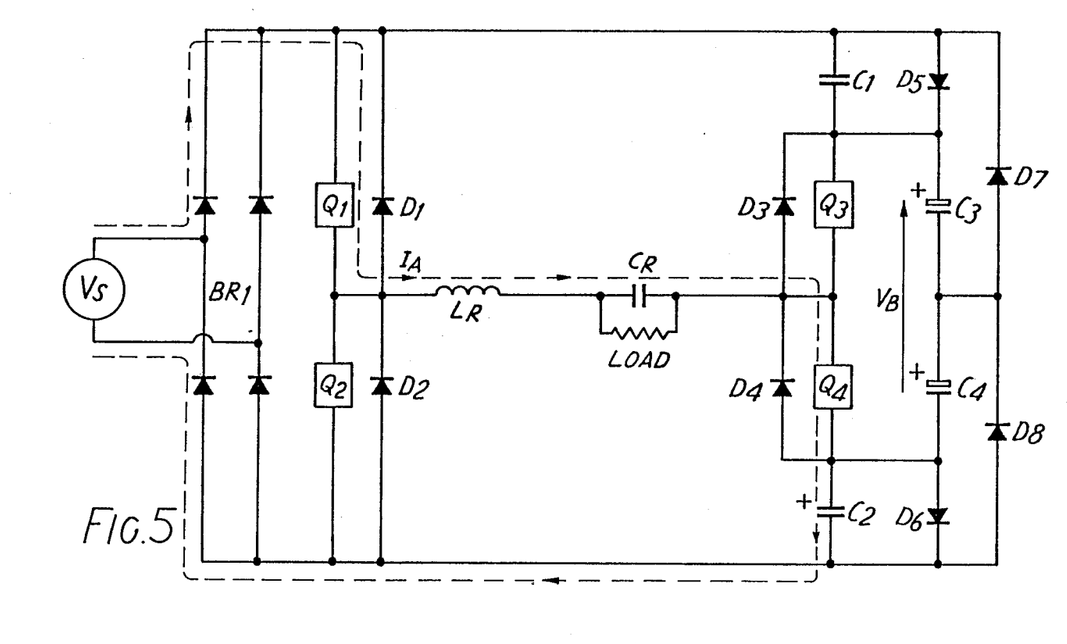
Figure 6:
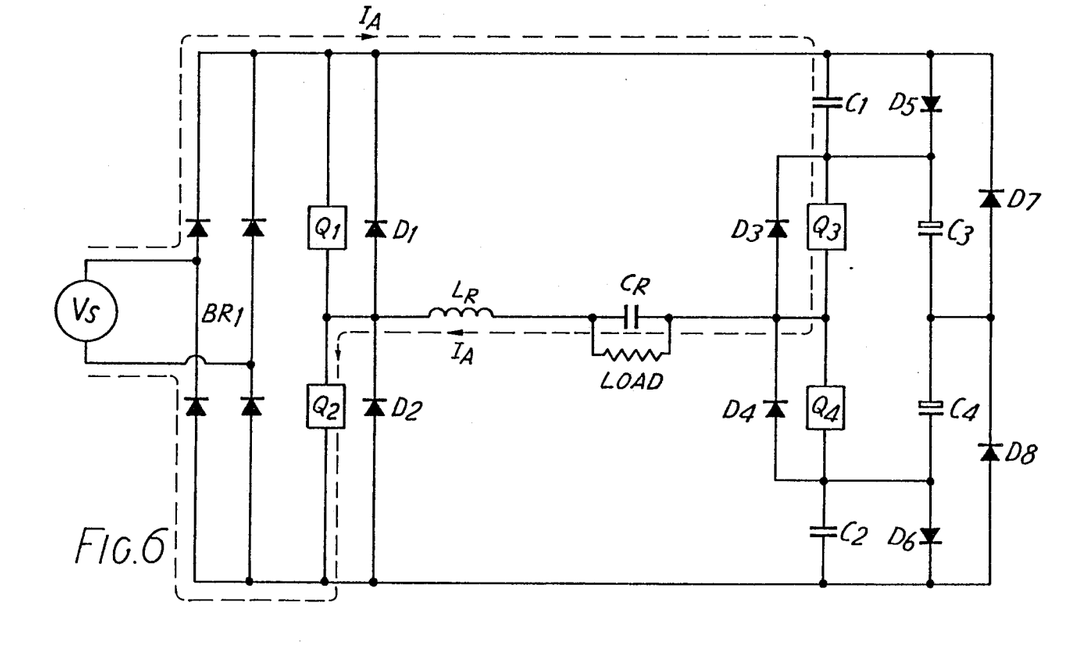

In the event that the instantaneous rectified supply voltage approaches the same level as $V_B$ across the buffer capacitors $C_3$ and $C_4$, which occurs in each supply cycle as a peak is approached, a current $I_A$ is drawn directly from the rectified supply by the load, as shown in FIG. 5 for the case in which $Q_1$ and $Q_4$ are ON and in FIG. 6 for the case in which $Q_2$ and $Q_3$ are ON. Current $I_A$ tends to prevent capacitors $C_1$ and $C_2$ from charging and also does not charge $C_3$ and $C_4$. This tends to cause some distortion of the current waveform.

Figure 7:
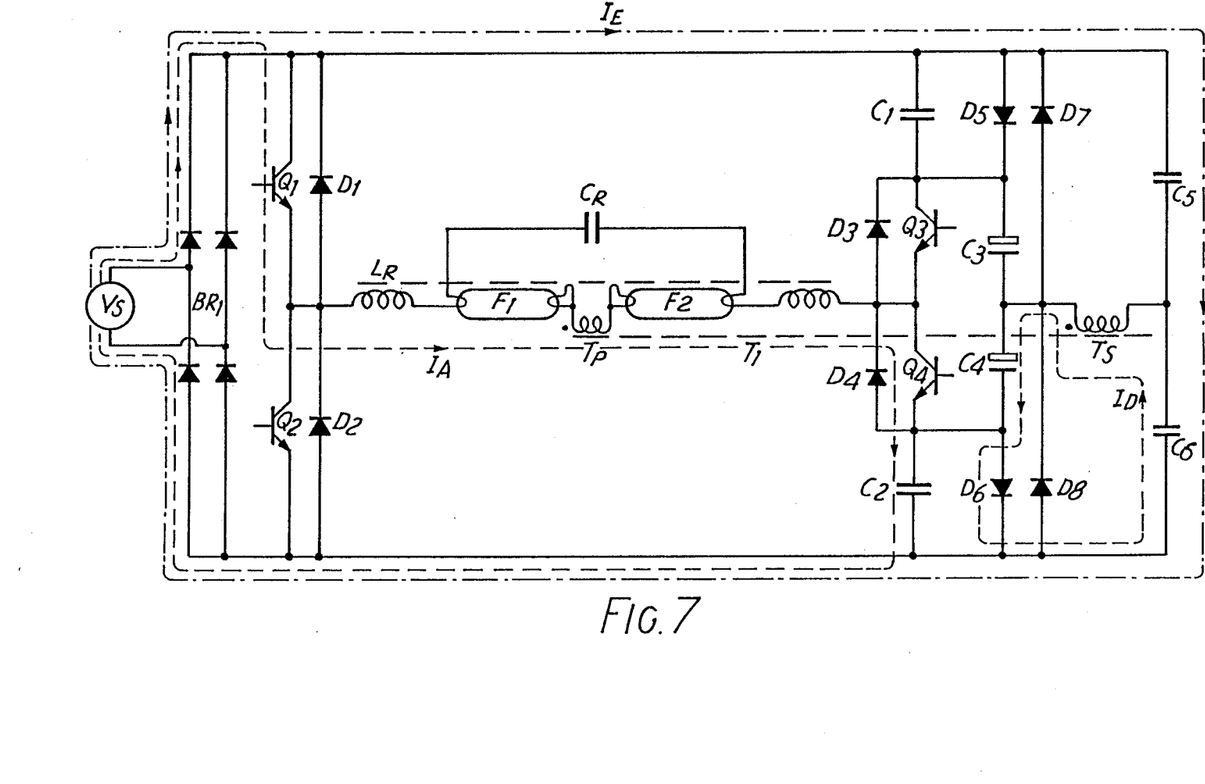
FIG. 7 is a circuit diagram of a preferred embodiment of the switched mode power supply of the invention, used to control gas discharge lamps.

A further aspect of the invention is therefore illustrated in FIG. 7. This shows two discharge lamps $F_1$ and $F_2$, which form the load, arranged in series with one another and with a primary winding $T_p$ of a transformer $T_1$ (an electromagnetic coupling device). A capacitor $C_R$ is in parallel with the lamps and $T_p$. The inductor $L_R$ is the lamp choke. The lamps are connected across the supply via a pair of alternatively operative switching means, as described earlier.

A capacitive network is connected across the output of the supply, the capacitive network providing a specific capacitive circuit across one switching element of each switching means. The network incorporates a secondary winding $T_S$ of $T_1$. In FIG. 7, capacitors $C_2$, $C_4$ and $C_6$ operate in conjunction with switching element $Q_4$ and capacitors $C_1$, $C_3$ and $C_5$ operate in association with switching element $Q_3$. $T_S$ is common to the specific capacitive circuits and the diodes $D_1$, $D_2$, $D_3$ and $D_4$ bridge the respective switching elements as shown.

When the lamps $F_1$ and $F_2$ are running, the load current $I_4$ flowing in the primary winding $T_p$ of the transformer causes an induced e.m.f. to be generated in the secondary coil which causes current $I_D$ to flow. When switching devices $Q_1$ and $Q_4$ are conducting, current $I_D$ flows as shown in FIG. 7 and tends to charge capacitor $C_4$ and discharge capacitor $C_6$. When $Q_2$ and $Q_3$ are conducting, $I_D$ flows in the upper part of the capacitive network and tends to charge capacitor $C_3$ and discharge capacitor $C_5$. Capacitors $C_3$ and $C_4$ are therefore charged by the introduction of $I_D$ which compensates for the lack of charging in FIGS. 5 and 6. When $V_{C5}+V_{C6}$ (where $V_{C5}$ and $V_{C6}$ are the voltages across $C_5$ and $C_6$ respectively) falls below the instantaneous rectified supply voltage, a current $I_E$ flows from the supply.

Currents $I_B$ and $I_D$ therefore maintain the charge across the smoothing capacitors $C_3$ and $C_4$ throughout the supply cycles and substantially prevent current spikes being drawn from the A.C. supply. The current $I_D$ is proportional to the load current, so that if the current drawn by the load is reduced, the charge to buffer capacitors $C_3$ and $C_4$ is also reduced. For example, in the case where the load comprises discharge lamps, if the lamps are dimmed, the energy transferred to $C_3$ and $C_4$ is reduced by the same proportion, thus preventing the over-generation of energy in $C_3$ and $C_4$.

Current ($I_E$ and $I_A$ or $I_B$) is always being drawn from the supply and the resultant supply current waveform has low harmonic distortion and a high power factor. It will be appreciated that $I_E$ is phase shifted from $I_A$ and $I_B$. This results from the lamp current lagging the resonant current. The current drawn from the supply is therefore substantially continuous and the radio frequency interference generated is low.

It will be appreciated that the invention could also be used for supplying power to loads other than discharge lamps.

The buffer capacitance provided by capacitors $C_3$ and $C_4$ could be achieved by one large capacitor across $Q_3$ and $Q_4$ which would enable smaller capacitors to be used on the basis of capacitors $C_3$ and $C_4$.

I claim:

1. A switched mode power supply operative on a unidirectional input current from a rectified supply having positive and negative supply lines derived by a full wave rectifier from an alternating supply for providing an output current to a load, the power supply comprising:
    capacitive smoothing means,
    a first switching means and a second switching means, said switching means being alternately conductive, each switching means comprising a first switching element and a second switching element, and, in use, being operative to connect a load between the positive and negative supply lines of the rectified supply, in use the current through the load being in one direction when said first switching means is conductive, and being in the opposite direction when said second switching means is conductive, each switching element of said first and second switching means being shunted by a return unidirectional device, said first switching element of said first switching means and said first switching element of said second switching means being connected in series to form a first series connection, said second switching element of said first switching means and said second switching element of said second switching means being connected in series to form a second series connection, the capacitive smoothing means being connected in parallel across said first series connection and being coupled to the positive supply line of the rectified supply via a first further capacitive means and to the negative supply line of the rectified supply via a second further capacitive means, such that said capacitive smoothing means and said first and second further capacitive means form a series connection across the positive and negative supply lines, each of the further capacitive means being shunted by a respective unidirectional device, whereby, in operation, said capacitive smoothing means may discharge through, and so as to charge, one or other of said first and second further capacitive means, said second series connection being connected directly across the positive and negative supply lines, the arrangement being such that, in operation, current draw from the rectified supply is substantially continuous.

2. A switched mode power supply according to claim 1 in which any of the unidirectional devices are diodes.

3. A switched mode power supply according to claim 1 in which the switching elements are MOSFETs.

4. A switched mode power supply according to claim 1 in which the switching elements are gate turnoff thyristors.

5. A switched mode power supply according to claim 1 in which the switching elements are transistors.

6. A switched mode power supply according to claim 1 in which the full wave rectifier is a diode bridge.

7. A switched mode power supply according to claim 1 used to provide a power supply to a load comprising at least one discharge lamp.

8. A switched mode power supply operative on a unidirectional input current derived by a full wave rectifier from an alternating supply for providing an output current to a load, the power supply comprising:

first and second alternatively conducting switching means, each of said first and second switching means comprising a first switching element and a second switching element, a return unidirectional device shunting each switching element, said first switching element of said first switching means and said first switching element of said second switching means being connected in series to form a first series connection, first and second capacitive smoothing means, connected in series across said first series connection, one said smoothing means being associated with said first switching element of the first switching means and the other smoothing means being associated with said first switching element of the second switching means, a capacitive network being arranged to provide a respective specific capacitive circuit associated with each said first element of said first and second switching means, each specific capacitive circuit comprising a respective one of said first and second capacitive smoothing means, and an electromagnetic coupling device comprising a primary winding coupled to the load and a secondary winding which is common to the specific capacitive circuits, the arrangement being such that, in operation, current draw from the alternating supply is substantially continuous, the current draw from the alternating supply being controlled, at least once in each alternating supply cycle, by a current which flows alternately in each of the specific capacitive circuits, said current flowing in each specific capacitive circuit being controlled by an e.m.f. generated in the secondary winding of the electromagnetic coupling device due to the load current which flows in the preliminary winding.

9. A switched mode power supply according to claim 8 in which any of the unidirectional devices are diodes.

10. A switched mode power supply according to claim 8 in which the switching elements are MOSFETs.

11. A switched mode power supply according to claim 8 in which the switching elements are gate turnoff thyristors.

12. A switched mode power supply according to claim 8 in which the switching elements are transistors.

13. A switched mode power supply according to claim 8 in which the full wave rectifier is a diode bridge.

14. A switched mode power supply according to claim 8 used to provide a power supply to a load comprising at least one discharge lamp.

* * * * *